Oct. 6, 1970  JAMES E. WEBB  3,532,807
ADMINISTRATOR OF THE NATIONAL AERONAUTICS
AND SPACE ADMINISTRATION
AUTOMATIC CLOSED CIRCUIT TELEVISION ARC GUIDANCE CONTROL
Filed Oct. 5, 1967  3 Sheets-Sheet 1

WILLIAM A. WALL JR.
DOUGLAS L. STEPHENS
INVENTOR.(S)

ATTORNEYS

Oct. 6, 1970  
JAMES E. WEBB  
3,532,807  
ADMINISTRATOR OF THE NATIONAL AERONAUTICS  
AND SPACE ADMINISTRATION  
AUTOMATIC CLOSED CIRCUIT TELEVISION ARC GUIDANCE CONTROL  
Filed Oct. 5, 1967  
3 Sheets-Sheet 2

WILLIAM A. WALL JR.  
DOUGLAS L. STEPHENS  
INVENTOR.(S)

ATTORNEYS

Oct. 6, 1970  JAMES E. WEBB  3,532,807
ADMINISTRATOR OF THE NATIONAL AERONAUTICS
AND SPACE ADMINISTRATION
AUTOMATIC CLOSED CIRCUIT TELEVISION ARC GUIDANCE CONTROL
Filed Oct. 5, 1967  3 Sheets-Sheet 3

WILLIAM A. WALL JR.
DOUGLAS L. STEPHENS
INVENTOR.(S)

ATTORNEYS

United States Patent Office 3,532,807
Patented Oct. 6, 1970

3,532,807
AUTOMATIC CLOSED CIRCUIT TELEVISION ARC GUIDANCE CONTROL
James E. Webb, Administrator of the National Aeronautics and Space Administration, with respect to an invention of William A. Wall, Jr., and Douglas L. Stephens, both of Huntsville, Ala.
Filed Oct. 5, 1967, Ser. No. 673,228
Int. Cl. B23k 7/10, 37/02, 5/36
U.S. Cl. 178—6
7 Claims

ABSTRACT OF THE DISCLOSURE

A method for automatically welding a work piece by using a closed circuit television as a guidance system. With the television viewing the work surface, the lines of scan of the television are arranged parallel to the joint to be welded so that with the proper arrangement of lights, the brightest light source received by the television comes from the joint to be welded. With a blanking circuit to eliminate errors caused by light reflected from scratches and rough spots, all that is left is the television signal voltage generated from the bright weld joint along the single line of scan. As the weld torch is moved along the surface, corrections are made by counting the position of the line of scan containing reflections from the weld point and converting a change in position of the reflections to an analog voltage. A servo motor can be driven by the analog voltage to correct variations in position of the weld torch.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

(1) Field of the invention

This invention relates to automatic welding and more specifically to automatic welding using closed circuit television as a guidance control.

(2) Description of the prior act

In the art of automatic welding, many different methods have been developed to give a precision weld. When welding relatively large articles together such as, for example, tanks, ship hulls, etc., a type of automatic control utilizing a track and carriage is normally used. The track is commonly contoured to the shape of the articles to be joined and is placed parallel to the seam to be welded. A welding torch and other apparatus are supported on the carriage which moves along the track. Disclosure of the carriage and track is not necessary because they may be of a type similar to U.S. Pat. 3,229,883 issued to V. H. Yost on January 18, 1966.

As space travel is increased, former methods used in automatic welding have proved to be inadequate to meet the increased quality and reliability tests that a space vehicle has to undergo. Extensive x-ray and strength tests are required of any welded piece that is used as a flight item in space travel. These tests have revealed many flaws in the welded material which result in a tremendous waste of material and effort. Studies are continually being made to provide a welding technique that will reduce or eliminate flaws in welded material.

Some common methods previously used to automatically guide a welding electrode (torch) along an irregular weld joint (seam) are by electro-induction, opto-electric, resistive, mechanical feelers, and semi-automatic-manual techniques. The electro-induction sensor utilizes a phase shift sensing and a pulse detection means to locate the seam. This technique is to induce an electrical current in the work piece and detect a shift in the electrical phase and amplitude of an AC pickup signal which is caused by a movement of the weld joint with relation to the signal transducer. This type of sensor, since it usually depends on an electrical pickup signal, is frequently affected by hold-down tooling, electrical transients, heat from the welding process causing electrical drift, electromagnetic fields caused from the welding currents, and tack welds that short circuit the induced electric field. Many adjustments are required to optimize the equipment to peculiarities of each type of metal and its thickness.

Equipment changes are necessary for different metals because each metal (iron, steel, aluminum, etc.) is sensitive to a different frequency band. The total range of possible frequencies is very broad, but an electro-inductive arc guidance circuit must be tuned to a given frequency for a specific type of material and material thickness. This is due chiefly to the necessary signal penetration depth and the so-called skin effect of induced currents. Because of skin effect, offset of materials at the weld joint can cause extremely large tracking errors. Skin effect of materials is one of the major problems associated with the technique of electro-inductive welding arc guidance systems.

Opto-electrical welding guidance transducers pertain to the general category whereby a reflected light pattern from a weld joint is focused through a lens system onto an array of photo cells. The area of work surface viewed by the photo cells is typically small, usually of the order of 2.5 millimeters in diameter or less, because a small field of view is necessary to gain resolution. The transducer must be carefully set up over the seam. If the signal is momentarily lost for any reason, the transducer is completely lost and a major welding error will result. Signal levels derived from the photo cells are usually in the low millivolt or microvolt range; therefore, stray electrical noise is a major problem. Electrical signal drift is also a major problem since a few microvolts represents the accuracy range within which the welding system must fall. If a joint weld is tack welded on the top or torch side of the work, the tracking signal when over the tack weld is completely lost. Since the accepted practice of tack welding is almost always on the top side, this type of optical tracking is virtually useless. Transducers of this category are also prone to erroneously track scratches in the work surface. Variation in the surface reflectivity of the work material can affect the accuracy of the tracking signal.

Resistive or impedance matching incorporates resistance detectors rolling on either side of the weld joint to measure the resistance of the material on either side of the joint. This type of guidance transducer assumes that a resistance change on either side of the weld seam represents a change in the direction of the weld joint. The resistance of the material across the weld joint is measured with the difference being split to increase the resistance on the low resistivity side and decrease the resistance on the high resistivity side. To be able to measure a resistive difference, the material must be electrically isolated from the holddown tooling. No tack welds can be used because they short circuit the resistance of the joint. Also, a relatively high coefficient of resistance is required for impedance matching. (Aluminum does not fit into this category.) Uniformity required in the surface resistance of the material and the rolling resistance of the probes is usually a problem due to the heat of the welding process.

Mechanical feelers utilize a feeling device to mechanically sense the position of the weld seam and electrically control the attached welding electrode. Deep grooves in the material are required to maintain the feeling device in the seam. This limits the use to thicker materials and makes tack welds impossible. With the mechanical feeling device, an elaborate set-up is necessary to insure location and cross-seam maneuverability. Rolling wheels attached to the end of the feelers (or sensors) can deposit dust or contamination into the weld joint which frequently results in weld porosity. Since the joint sensor must be located near the electrode, heat from the welding process can damage the delicate sensor mechanism.

Semi-automatic welding is dependent upon the skill of the operator and his ability to see the weld joint. Elaborate and expensive tooling is required in order that the operator can track non-linear joints. A high degree of accuracy is not obtainable by the operator without elaborate aids. The ability of the weld operator to accurately track weld joints is greatly impaired if the welding speed is too fast. In general, his reaction time is not equal to the task.

The above described automatic welding processes have many problems that prevent their use in space vehicle fabrication. It is very impractical to use one of the above processes and then discover a flaw that causes an expensive workpiece to be scrapped. Human safety in space flight makes it imperative that no flaws be present. The novel and reliable automatic arc welding guidance control of the present invention solves these and other problems.

SUMMARY OF THE INVENTION

Accordingly, it is an object of the present invention to provide a welding arc guidance system which utilizes a video signal from a television system to automatically guide a welding electrode along either a tack welded or a non-tack welded joint.

Another object of the invention is to reduce flaws in the welding process, thereby decreasing cost and increasing human safety.

These and other objects are accomplished in the present invention by utilizing video signal created in a television camera by light reflected from a weld joint to generate a correction voltage used to position the welding torch. There are two light sources so arranged that each reflects on given lines of scan within the television field. If the reflections vary from the given line of scan, then the position of the torch is corrected through the operation of a servo motor controlled by the error in scan location of the reflected light beams. Two light sources are necessary if tack welds are used because of interference caused from a scattering of the light beam. In case of a curved weld joint, a delay time is incorporated in the correction signal; the delay time being determined by the distance from the reflected light to the torch and the speed of the torch.

BRIEF DESCRIPTION OF THE DRAWINGS

The invention will be more fully understood by the following detailed description when taken together with the accompanying drawing in which.

DESCRIPTION OF THE PREFERRED EMBODIMENTS

Figure 1:
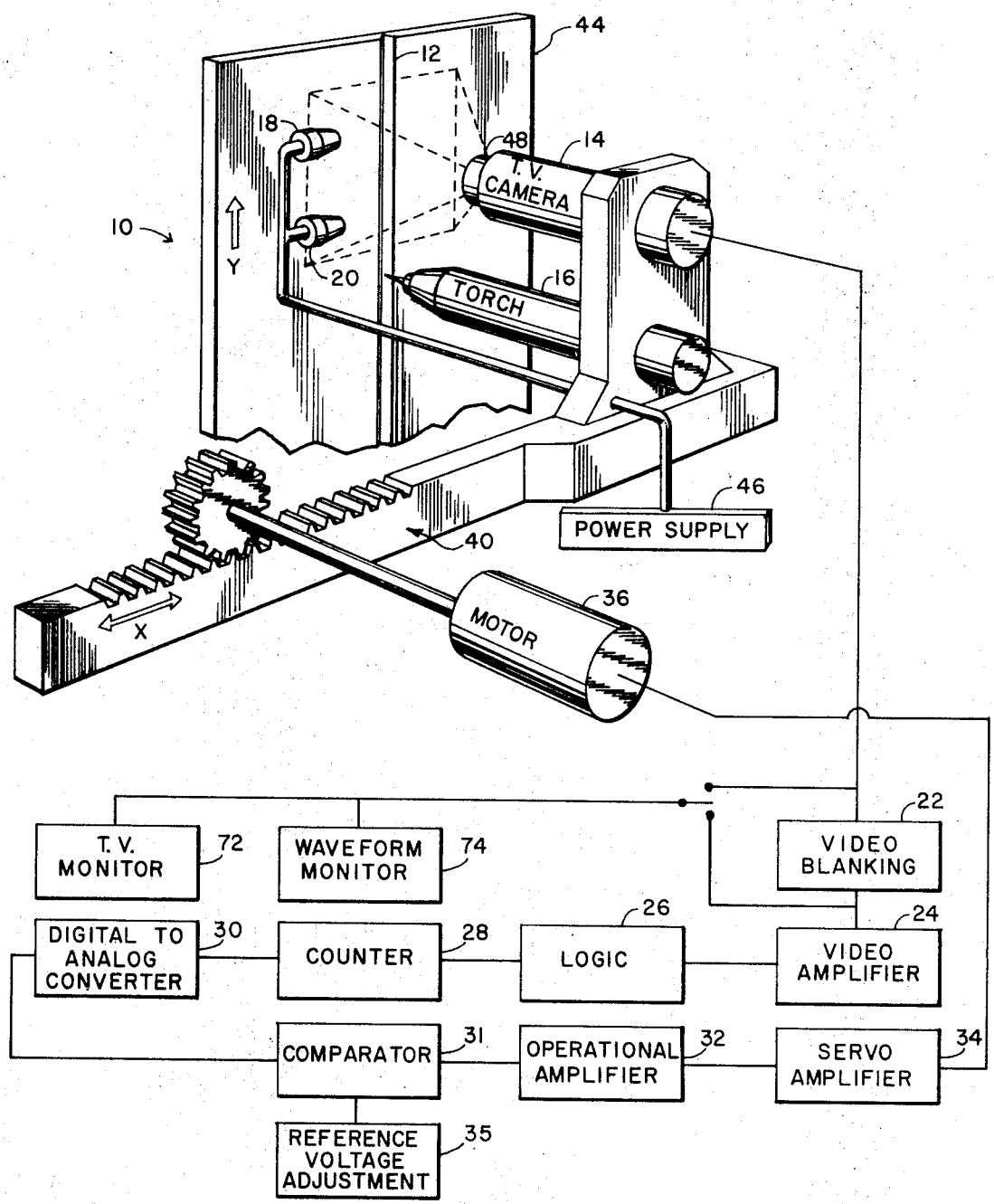
FIG. 1 is a symbolic diagram of the components of the automatic welding arc guidance system controlled by a television signal.

With continued reference to the accompanying figures, there is illustrated in FIG. 1 a typical arrangement of an automatic welding arc guidance system 10 utilizing light reflection from a weld seam 12 to a television camera 14 as a guidance control. The present invention is an automatic guidance control only in one plane. A complete three-dimensional guidance control is possible when the present invention is used in conjunction with a copending patent application by William A. Wall, Jr., Ser. No. 672,382 and filed on Oct. 2, 1967, now Pat. No. 3,469,068 or similar-systems.

It would be convenient before proceeding into the essence of the invention to give a brief description of part of a television operation. Television is accomplished by systematically scanning portions of a scene that is to be reproduced and, by a photo-electronic means, producing a voltage proportional to the light intensity of the particular part of the scene being scanned. As a scene is scanned by the electronics of the television camera, it is simultaneously reproduced in the receiver. The rate of scan is rapid enough to give the appearance of motion as the subject scene moves. Scanning starts in the upper-left corner of the field of view and scans horizontally from top to bottom. During return intervals of the scan from the right to the left side of the screen, the scan is blanked out.

The standard American television camera has two scan fields per frame. When the scan of the first field is completed, a second field is scanned which is interlaced between the lines scanned in the first field. The two fields make up one television frame with 525 scan lines in a frame or 262.5 lines in each field. A vertical synchronization pulse ($\frac{1}{60}$ second) control the beginning of each scan field and a horizontal synchronization pulse controls the beginning of each line of scan or 262.5 times per field. The vertical and horizontal sync pulses control the electronic focusing circuits which guide the electron beam to strike the photo sensitive surface in the scanning pattern explained above. Video information from the camera is formed into a composite signal with the vertical and horizontal timing pulses before being transmitted to the receiver. The video information voltage is proportional to the relative blackness or whiteness of the scan position on the screen.

With this relatively brief explanation of the scanning process of a television system, a better understanding can be obtained of the novelty of this invention. A general description of the components and their interrelationship will be given first followed by a detailed description of the individual components. A television camera 14 of FIG. 1, viewing a seam (joint) 12 to be welded, transforms the seam into a video signal just ahead of a moving welding torch (electrode) 16.

Figure 3:
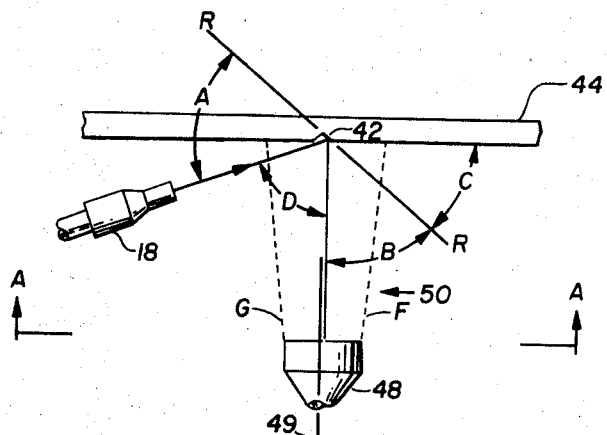
FIG. 3 is a partial sectional view of FIG. 1 to illustrate the workpiece, lights, and lens position.
Figure 4:
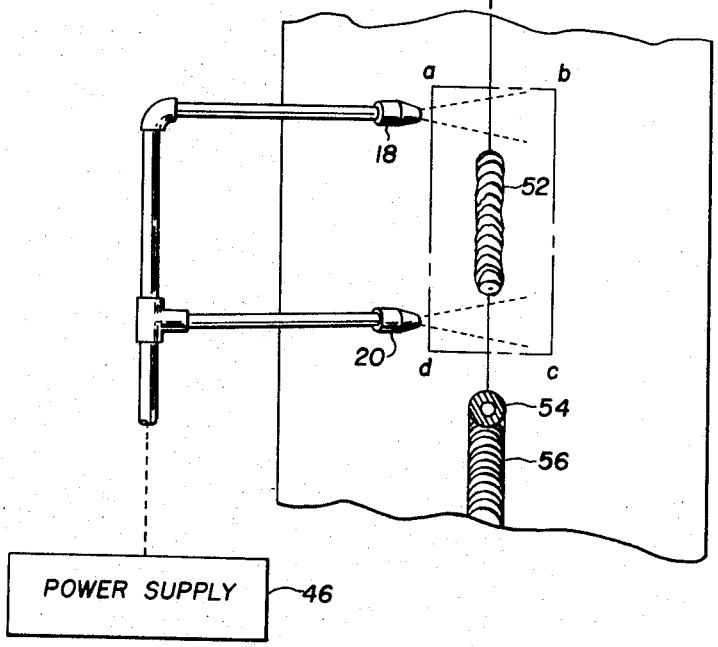
FIG. 4 is a sectional view taken along line A—A of FIG. 3.

The camera 14 is positioned so that the horizontal scan will be substantially parallel to the joint 12 to be welded. With two light sources 18 and 20 (positioned as shown in FIGS. 3 and 4) reflecting from the weld joint 12, both video signals representing each reflected light source will be produced on the same line or lines of scan. Thus, when one of the video signals is not present because of scattered reflection from a tack weld, the other video signal will be present on the same line or lines of scans. Because much of the screen does not contain useful information, this part of the screen is blanked out with a video blanking circuit 22, as will be explained more fully later.

The output of blanking circuit 22 is a combination of horizontal synchronizing pulses and video signal voltage. A video amplifier 24 amplifies the signal to a higher voltage and power level that can be used by the digital logic circuits 26. Logic circuits 26 then separate the video information from the synchronizing pulses to control a binary counter 28. Due to the control of the logic 26, the counter 28 will begin counting at the top of the television field and will count each successive horizontal line, 1, 2, 3, 4, 5 . . .) until the first scan line containing a video signal caused by the light reflected from the seam 12 is sensed. Appearance of the first scan line with video information stops the counter 28 on that line number. This number is then stored in a register section and the counter 28 is reset for operation during the next television field.

The stored horizontal line number in the register section of the counter 28 is next fed to a digital-to-analog (D-A) converter 30 which converts the number to a proportional DC voltage. This DC voltage representation of the stored number is then compared with a reference voltage. The reference voltage can be set in a comparator 31 with the reference voltage adjustment 35 corresponding to any scan line position desired, but it is usually set to a level equal to the center of the field of view. If the (D-A) output level is either less than or greater than the reference level, the difference btwen th two voltages will be a plus or minus DC error signal amplified by an operational amplifier 32 to the torch positioning servo amplifier 34.

An error signal to the servo amplifier 34 causes it to drive the motor 36 in a direction that will move the camera-torch carriage 40 along the X axis. Polarity of the error signal to the servo amplifier 34 determines the direction of X movement until the error difference is nulled. New error information is received much more rapidly than the carriage 40 can move because the counter 28 is counting and supplying new tracking data each time a television field is scanned. The television field scan rate is sixty per second. A continuous and rapid supply of position information, therefore, enables the servo system to maintain the welding arc on the weld centerline 49 (shown in FIG. 3).

In FIG. 3, a groove 42 in the seam 12 of a workpiece 44 provides the necessary reflection angle B for the light source 18 or 20 (see FIG. 4) from the power supply 46 (shown in FIG. 1) to a lens 48 in the television camera 14. With the angle of incidence A equal to the angle of reflection B, the light along a path is reflected by plane R—R. Optimum angle of reflection is 50° which leaves angle C to be 40° and angle D to be 80°. Of course other angles can be used, but it has been found that these angles give less unwanted reflections and more of the wanted reflections. The width of view 50 of the camera 14 is represented by lines F and G in FIG. 3, while in FIG. 4 the entire surface of view is shown by "abcd."

The welds are in common use today to hold the two workpieces together. Most typical tack welds are about two inches in length, but the surface of view "abcd" of the camera 14 is about three inches by 2.25 inches so that a tack weld 52 fits well within the length of view "ad" of the camera 14. As shown in FIG. 4, the length "ad" of the surface view "abcd" is longer than the tack weld 52. The width of view of the camera is represented by line "ab." The length of the line "ab" (the width of view) may be changed by adjusting the vertical sweep of the camera 14. For increased accuracy, the resolution can be increased simply by decreasing the width of view "ab" to one inch. With this increased resolution, one line of scan represents ±.002 inch, where before one line of scan represented ±.0045 inch.

The two light sources 18 and 20 in FIG. 4 have a separation wide enough that the tack weld 52 can scatter only one reflected light beam at a time. If the tack weld 52 scatters one reflected light beam, the other light beam will still be present on the same lines of scan. Because of the increased field of view "abcd" and two light sources 18 and 20, it is possible for this system 10 to track over normal tack weld 52. The torch 16, its location in FIG. 4 illustrated by 54, will weld over the tack weld 52 making a smooth uniform seam 56.

Figure 5:
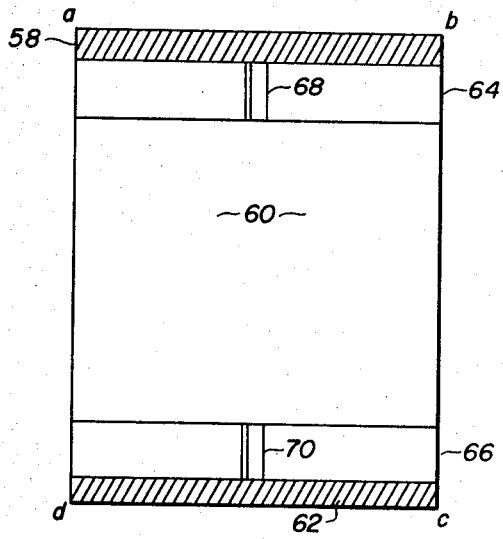
FIG. 5 is a view of the television monitor screen rotated 90° counterclockwise from it normal position with part of the signal blanked out.

Since the high peaks of video information from the lights occur close to the end of each horizontal scan, high video levels between these two peaks could only be caused by some unwanted reflection from a surface scratch or tack weld edge. Therefore, a blanking circuit 22 is switched on to eliminate such reflections and discriminate true information from error information. The video blanking circuit 22 is timed to eliminate all video information in each horizontal line except at the left and right end of the scan line or screen. FIG. 5, which is rotated 90° counter clockwise, same as the viewing camera 14, illustrates the monitoring of a weld joint using video blanking with 58, 60, and 62 being the blanked areas. Areas 64 and 66 in the scan line are not blanked out and may pass video information. Two parts 68 and 70 of the weld seam 12 are shown in the non-blanked areas 64 and 66. If a tack weld interferes with the reflection of one light source 18 or 20 from the weld seam 12, the other reflected light source will be present to provide the necessary guidance signal.

In a normal operation of the system, the video signal is routed to a television monitor 72 and waveform monitor 74 as shown in FIG. 1. Also, the signal is amplified to raise its voltage and power to a level which can be used by the logic section 26. Logic circuits 26 then separate the video information from the synchronizing pulses to control the binary counter 28. The counter 28 locates the bright line of scan caused by the weld joint illumination by stopping the count on that line number. This number is then stored in a register section of the counter 28 and the counting chain is reset for operation during the next television field.

A D-A converter 30 changes the number to a proportional DC voltage to be compared to the reference voltage. The reference voltage is set into the comparator 31 which gives the difference between the output of the D-A converter 30 and the reference voltage as an error signal. Amplification of the error signal by the operational and servo amplifiers 32 and 34 is necessary to drive a servo motor 36 to correct the position of the camera-torch carriage 40. Polarity of the error signal determines the direction of movement of the carriage 40 and its associated parts, such as the camera 14, the torch 16, and the lights 18 and 20.

Figure 2:
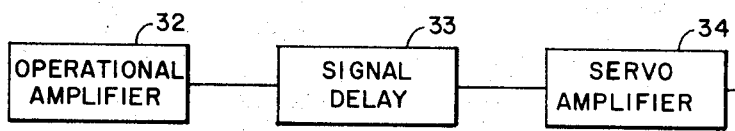
FIG. 2 is a block diagram showing a delay circuit that may be added to FIG. 1 as a modification.
Figure 6:
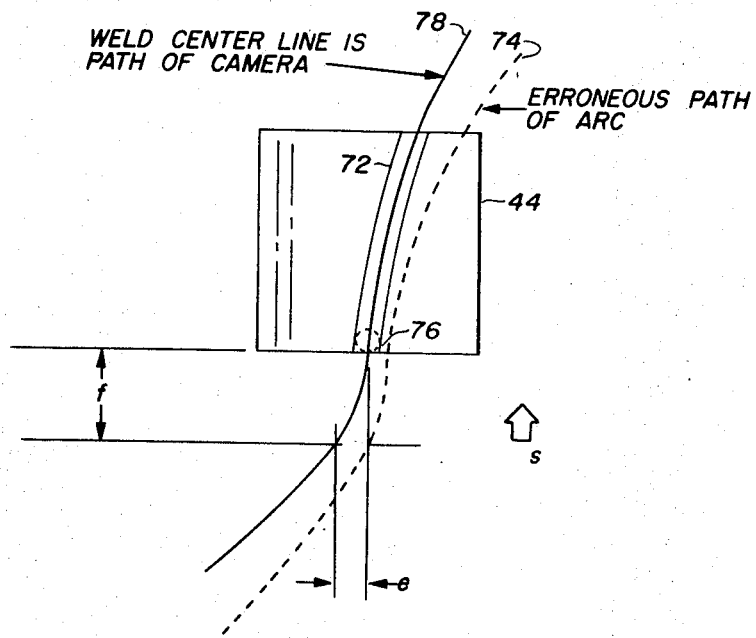
FIG. 6 is a diagrammatical view showing the error along a curved path if a signal delay is not used.

Up until this point, the disclosure has been referring to a weld seam that is represented by a substantially straight line in one plane. For example, a seam around a vertical tank can be represented by a straight horizontal line if the seam is horizontal and encircles the tank. Small deviations from a straight line weld can be corrected in the guidance system 10 as the present disclosure stands, but for larger deviations a modification must be made. FIG. 6 shows a curved weld joint 72 and an erroneous path 74 the torch 16 would follow if guided by one light source 76 reflecting into the camera lens 48 to form the path of the camera 78. The distance between the light 76 and the welding torch 16 is represented by "f" while "s" represents the speed of the torch. The resulting error "e" is due to the curved line path. If the correctional signal resulting from the reflected light was delayed by an amount "$T_D$" where $$T_D = \frac{D}{S}$$

and where D is the distance along the path in cm. and S is the speed of the electrode 16 in cm./min., the torch 16 would then follow the curved weld joint 72. This delay $T_D$ is accomplished by the insertion of a signal delay 33 between the operatinal amplifier 32 and the servo amplifier 34 as shown in FIG. 2. Many different types of signal delay devices are available.

From the foregoing it may be seen that the applicants have invented a novel method and apparatus for automatically guiding a welding arc torch. The method disclosed uses a video signal in a television camera to automatically guide the torch by using light reflection from the weld seam. Logic circuits, amplifiers, and a servo motor are then used to correct the position along the X axis. This invention automates the welding process only along one axis, and it is part of a larger invention to develop a completely automated welding system.

Obviously, numerous modifications and variations of the present invention are possible in the light of the above teachings. It is therefore to be understood that, within the scope of the attendant claims, the invention may be practiced otherwise than is specifically described.

What is claimed is:

1. In a welding apparatus of the type wherein a mechanism moves an electrode along a seam, an improved guidance system for continually locating the electrode along the seam, comprising:
   a television camera adapted to scan a field of view containing bright points of lights reflected from said seam, the lines of scan of said television camera being approximately parallel to said seam;
   means for selecting a reference line of scan of said camera as the normal location of the video signal of said bright points of light, said means for selecting also producing an error signal representative of any deviation between an instantaneous line of scan containing video information of said bright points and said reference line of scan; and
   means for positioning said camera and said electrode in response to said error signal, said positioning means guides said camera so that said bright points are contained within the field of view.

2. The guidance system of claim 1 wherein said electrode is mounted to a carriage.

3. The guidance system of claim 2 further comprising a lighting means that is adapted to create said bright points of reflected light, said lighting means moves as said carriage moves along said seam.

4. The tracking system of claim 1 further comprising:
   a blanking circuit means for eliminating all unwanted video information of said camera.

5. The tracking system of claim 4 further comprising:
   a video amplifier inserted after said blanking circuit means to raise the voltage and power level of the output signal of said camera to a level normally used by computing logic; and
   logic circuits inserted between said video amplifier and said means for selecting a reference line of scan, said logic circuits separating synchronization pulses from said video signal of said camera.

6. The tracking system of claim 4 further comprising a waveform monitor and a television monitor, said waveform monitor and said television monitor being connected to the common terminal of a two position switch, one position of said switch being connected to the output of said television camera and the other position of said switch being connected to the output of said blanking circuit.

7. In a welding apparatus of the type wherein a mechanism moves an electrode along a seam, an improved automatic welding guidance system for continually locating the electrode along the seam, comprising:
   a television camera for viewing the seam to be welded, said camera being oriented so that the lines of scan of said camera are substantially parallel to said seam;
   a light source creating bright points of light along said seam, said bright points of light being reflected into said camera on the same lines of scan;
   a blanking circuit for eliminating unwanted video signals from sections of the horizontal scan lines of said camera;
   video amplification means to increase the blanking circuit output to a level used by digital logic;
   logic circuits connected to the output of said video amplifier to separate synchronizing pulses from said video signal;
   a digital counter connected to the output of said logic circuits for determining the first line of scan that contains said video signal;
   a digital-to-analog converter that converts the count of said first scan line containing said video signal into an analog voltage representation;
   a voltage comparator that has a reference voltage input which establishes a reference line of scan where the first line of scan is normally located, said comparator comparing the digital-to-analgo converter output to said reference voltage and generating an error signal from the difference of two said voltages;
   a welding electrode;
   a carriage, said carriage supporting said electrode, said light source, and said camera; and
   said carriage having a motor drive responsive to the error signals of said voltage comparator.

References Cited

UNITED STATES PATENTS

| | | | |
|---|---|---|---|
| 3,009,049 | 11/1961 | Stanley | 219—124 |
| 3,043,907 | 7/1962 | Martin | 178—6.8 |
| 3,370,151 | 2/1968 | Normando | 228—9 |

ROBERT L. GRIFFIN, Primary Examiner

H. W. BRITTON, Assistant Examiner

U.S. Cl. X.R.

178—6.8; 219—124; 228—7, 45